United States Patent [19]

Green

[11] Patent Number: 4,647,608

[45] Date of Patent: Mar. 3, 1987

[54] PROCESS FOR THE PRODUCTION OF POLYOLEFIN RESINS CONTAINING AN AMIDE AND A ZINC COMPOUND

[75] Inventor: John G. Green, Baton Rouge, La.

[73] Assignee: The Dow Chemical Company, Midland, Mich.

[21] Appl. No.: 843,362

[22] Filed: Mar. 21, 1986

[51] Int. Cl.[4] .................................................. C08K 5/20
[52] U.S. Cl. ...................................... 524/232; 523/353
[58] Field of Search ........................ 524/232; 523/353

[56] References Cited

U.S. PATENT DOCUMENTS

| | | | |
|---|---|---|---|
| 2,770,608 | 11/1956 | Barker et al. | 524/232 |
| 3,330,796 | 7/1967 | Mock et al. | 524/232 |
| 3,645,822 | 2/1972 | Widiger et al. | 524/232 |
| 3,803,065 | 4/1974 | Arai et al. | 524/232 |
| 4,000,102 | 12/1976 | Shima et al. | 524/232 |
| 4,345,046 | 8/1982 | Ejk et al. | 524/583 |
| 4,394,458 | 7/1983 | Wade | 521/82 |
| 4,510,281 | 4/1985 | Smith | 524/229 |
| 4,520,137 | 5/1985 | Hamel et al. | 521/79 |

FOREIGN PATENT DOCUMENTS

| | | | |
|---|---|---|---|
| 226565 | 12/1958 | Australia | 524/232 |
| 615531 | 2/1961 | Canada | 524/232 |
| 1034337 | 6/1966 | United Kingdom | 524/232 |

*Primary Examiner*—Joseph L. Schofer
*Assistant Examiner*—N. Sarofim
*Attorney, Agent, or Firm*—Arthur J. Young

[57] ABSTRACT

A method for the production of polyolefin resins containing both an organic amide and a zinc compound. One composition is prepared which contains the polyolefin and the amide, but which does not contain the zinc compound. Another composition is prepared which contains the polyolefin and the zinc compound, but which does not contain the amide. The two compositions are extruded separately, and the individual resins so obtained are blended to form the desired resin composition containing both the amide and the zinc compound, thereby preventing the zinc stearate from catalyzing the dehydration of the aliphatic amide to a nitrile.

6 Claims, No Drawings

PROCESS FOR THE PRODUCTION OF POLYOLEFIN RESINS CONTAINING AN AMIDE AND A ZINC COMPOUND

BACKGROUND OF THE INVENTION

The present invention relates to the manufacture of polyolefin resins. More particularly, it relates to the extrusion of polyethylene resins containing abherent additives such as an organic amide and a zinc salt.

An abherent additive is a substance that prevents or reduces adhesion of a material to itself or to another material. Other terms used for abherent additives include release agent, parting agent, antiblocking agent, slip aid, and external lubricant. Waxy amides are used as adherents in addition to their use as internal lubricants. The most common examples are ethylene bis(stearamide), oleamides, and erucamide. The metal salts of stearic acid, such as zinc stearate, and of other fatty acids are also widely used as abherents or release agents for polyolefins.

SUMMARY OF THE INVENTION

In general, the present invention provides a process for the extrusion of polyolefins to form an extrudate containing both an organic amide and a zinc compound. It has been discovered that the dehydration of aliphatic amides to nitriles is catalyzed by zinc salts, particularly at elevated temperatures. It is sometimes desirable, however, to extrude a polyolefin resin which contains both zinc stearate and an organic amide. If both components are added to the polyolefin prior to extrusion, the result is dehydration of some or all of the amide. To overcome this problem, the method of the present invention comprises (a) preparing a first composition which contains the polyolefin and an aliphatic amide but substantially no zinc stearate, (b) preparing a second composition which contains the polyolefin and zinc stearate but substantially no amide, (c) separately extruding the first and second compositions as first and second extrudates, and (d) blending the first and second extrudates. The final blend contains both components, but the use of separate compositions prevents undesirable interaction of the components during extrusion. The final blend of components exhibits both good processing and antiblocking properties, and very little loss of the aliphatic amide additive.

DESCRIPTION OF THE PREFERRED EMBODIMENTS

The following description illustrates the manner in which the principles of the present invention are applied, but is not to be construed as in any sense limiting the scope of the invention.

The custom compounding required for commercial polyolefin resins generally includes the use of abherents, anti-oxidants, internal lubricants, and fillers. Some resins contain at least one of each of these classes of additives; other resins may contan only one type of additive. When an organic amide and a zinc salt such as zinc stearate are used in combination prior to extruding the resin, decomposition of the amide will occur. The higher the extrusion temperature and the longer the extrusion time, the more extensive is the decomposition of the amide. It has been found that the reason for this particular problem is that zinc salts catalyze the thermal dehydration of organic amides to nitriles.

The present invention provides a simple and effective solution to this problem. According to the method of the invention, resins containing only one of these two components are extruded separately, after which the extrudates are combined to form the desired resinous product which provides both the desired processing and antiblocking properties.

The above disclosure is supported by the following experimental evidence:

(1) Resins made with aliphatic amides but without zinc stearate retained more of the amides in the final products than resins made with both the amides and zinc stearate.

(2) Resins made with both an aliphatic amide and zinc stearate, and extruded as a single composition were extracted with chloroform in a Soxhlet extraction apparatus. The extracts were filtered and concentrated, then analyzed by infrared spectroscopy. The spectra showed peaks at 2250 reciprocal centimeters ($cm^{-1}$) indicative of the presence of the nitrile group ($C\equiv N$).

(3) Resins made with the same amide but without zinc stearate were analyzed by the procedure described in the above paragraph (3), and the spectra so obtained did not exhibit a peak at or near 2250 $cm^{-1}$, indicating the absence of any significant amount of nitrile in the extruded resins.

(4) A sample of an aliphatic amide (cis-13-docosenamide, erucamide, $C_{21}H_{41}CONH_2$) was held at 250° C. for thirty-three minutes. Analysis thereafter showed that six percent of the amide had decomposed.

(5) A second sample of the amide was mixed with an equal weight of zinc stearate, and the mixtures was held at 250° C. for fifteen minutes. Subsequent analysis showed that more than sixty percent of the amide had decomposed.

While the concentrations of amide and zinc salt may vary within wide limits, for practical purposes the limits may be said to be, for the organic amide, from about two hundred to about ten thousand parts per million parts of polyolefin, an for the zinc salt from about one hundred to about ten thousand parts per million parts of polyolefin by weight, respectively. While the scope of the present invention includes aliphatic, cycloaliphatic, and aromatic amides; aliphatic amides are preferred.

The invention will now be illustrated by the following examples.

EXAMPLE 1

A first additive mixture was prepared by mixing 1.2 parts of erucamide in 3.8 parts of mineral oil by weight. A second additive mixture was prepared by blending thirty-five parts of zinc stearate with sixty-five parts of mineral oil by weight. A first composition was prepared by blending 11,400 parts of the second additive mixture with one million parts of polyethylene by weight. A second composition was prepared by blending five thousand parts of the first additive mixture with one million parts of polyethylene by weight. The first and second compositions were separately extruded as pellets at 190°–260° C. The two separate batches of pellets were then blended to obtain the desired resin composition with calculated concentrations of six hundred parts of erucamide and two thousand parts of zinc stearate per million parts of polyethylene by weight. Infrared analysis of the blended resin so obtained showed that substantially none of the amide had decomposed to the nitrile.

COMPARATIVE EXAMPLE 2

A single composition containing four hundred parts of erucamide and two thousand parts of zinc stearate per million parts of polyethylene by weight was extruded as pellets at 190°–260° C. Infrared analysis of the extruded resin showed that an appreciable amount of the amide had decomposed to the nitrile.

As shown by the foregoing examples, the use of the present invention not only provides satisfactory operation and prevents loss of a valuable additive, but such use is also effective in eliminating or substantially reducing the amount of nitriles which are otherwise present when both an aliphatic amide and zinc stearate are included in a composition which is extruded at temperatures approximating 190°–260° C.

While certain specific embodiments and details have been shown for the purpose of illustrating the present invention, it will be apparent to those skilled in the art that many modifications can be made therein without departing from the spirit and scope of the invention.

What is claimed is:

1. A method for the production of polyolefin resins containing both an organic amide and a zinc compound, comprising the steps of:
   (a) preparing a first composition which includes a polyolefin and an aliphatic amide but substantially none of the zinc compound;
   (b) preparing a second composition which includes the polyolefin and the zinc compound but substantially none of the amide;
   (c) separately extruding the first and second compositions as first and second extrudates; and
   (d) blending the first and second extrudates to form the desired resin composition containing both the amide and the zinc compound.

2. The method of claim 1, wherein the polyolefin is polyethylene.

3. The method of claim 1, wherein the amide is cis-13-docosenamide.

4. The method of claim 1, wherein the zinc compound is zinc stearate.

5. The method of claim 1, wherein the concentration of the amide in the first composition is from about two hundred to about ten thousand parts per million parts of polyolefin by weight.

6. The method of claim 1, wherein the concentration of zinc stearate in the second composition is from about one hundred to about ten thousand parts per million parts of polyolefin by weight.

* * * * *